Figure 1:
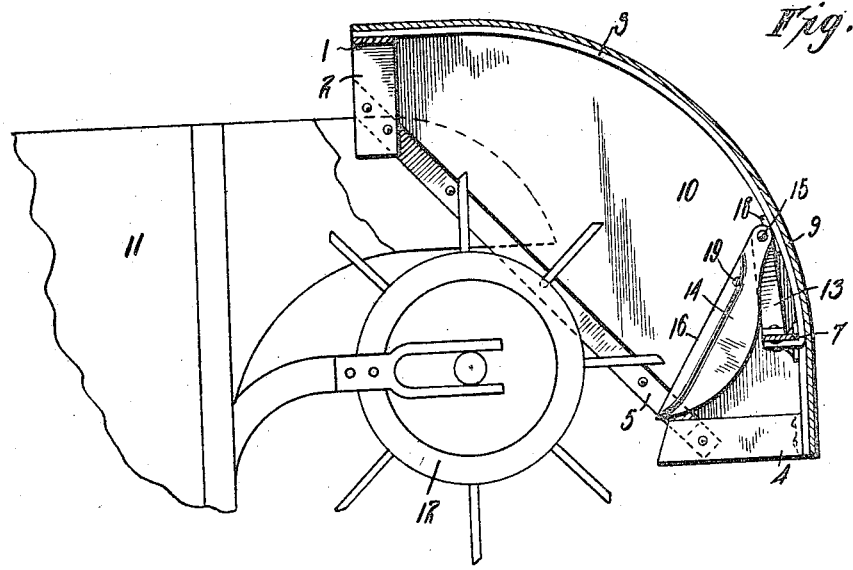

T. FELCYN.
ATTACHMENT FOR MANURE SPREADERS.
APPLICATION FILED DEC. 2, 1916.

1,259,089.

Patented Mar. 12, 1918.

Witnesses

Inventor
Thomas Felcyn
By
Attorney

UNITED STATES PATENT OFFICE.

THOMAS FELCYN, OF IVANHOE, MINNESOTA.

ATTACHMENT FOR MANURE-SPREADERS.

1,259,089.   Specification of Letters Patent.   Patented Mar. 12, 1918.

Application filed December 2, 1916. Serial No. 134,652.

*To all whom it may concern:*

Be it known that I, THOMAS FELCYN, a citizen of the United States, residing at Ivanhoe, in the county of Lincoln and State of Minnesota, have invented certain new and useful Improvements in Attachments for Manure-Spreaders, of which the following is a specification.

This invention relates to an attachment for a manure spreader, and more particularly to a hood or shield adapted to be mounted about the spreader cylinder and provided with disintegrating means.

As is well known, in order to obtain the best possible results, the manure which is spread by a machine should be in a finely subdivided or comminuted condition and should be spread uniformly and evenly.

One of the main objects of the invention is to provide a hood or shield of simple construction, which can be easily attached to a standard spreader and which will prevent the manure from being blown about, as it is discharged from the spreader cylinder.

A further object is to provide means for cutting up or disintegrating the manure, so as to insure fine and uniform division of the same.

Further objects will appear from the detail description.

Figure 2:
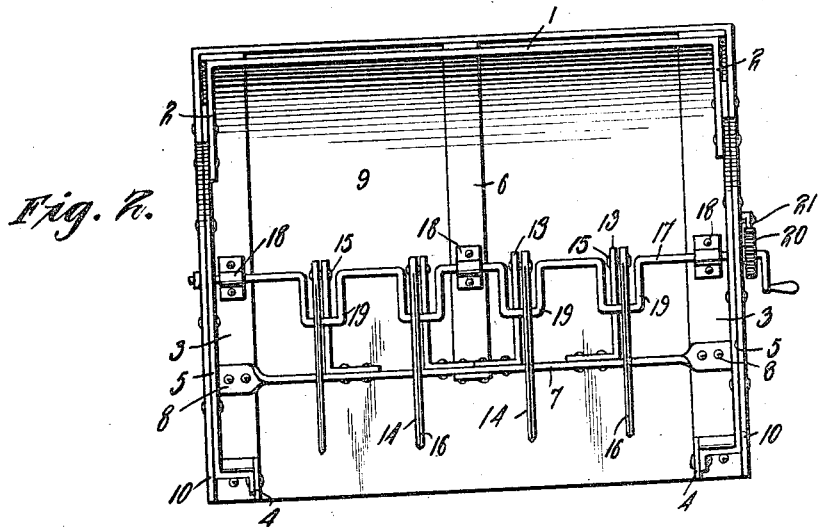

In the drawings:

Figure 1 is a transverse vertical sectional view through the attachment, as applied, and Fig. 2 is a front view of the attachment.

The numeral 1 designates a top bar, the ends of which are turned down at right angles to provide securing arms 2. At each end of the bar 1 is secured a rearwardly extending arcuate bar 3. An angle bracket 4 is riveted to the lower end of each bar 3 and has its inner end riveted to the lower end of an inclined brace bar 5, the upper end of which is riveted to the securing arm 2. An intermediate arcuate bar 6 is secured to the top bar 1, between the end bars 3. The lower end of the bar 6 is turned inward at right angles and is secured to a cross bar 7, the ends of which are riveted to the end bars 3, as at 8. These bars all coöperate to form an arcuate hood which is inclosed by a sheet metal cover or top 9 and sheet metal end plates 10 secured over the bars. This hood is adapted to be secured to the back of a manure spreader 11, so as to extend about the spreader cylinder 12 thereof which is rotatably supported on the spreader body and driven by means of the usual gearing, connecting it to the ground wheels of the spreader.

A plurality of L-brackets 13 are secured to the cross bar 7 and extend upward from the same vertically. A heavy blade 14 of semi-elliptical shape is pivotally secured at its upper end, as at 15, to the upper end of the vertical arm of each of the brackets 13. The straight inner edge of this blade is ground to provide a cutting edge 16. These blades lie in planes extending longitudinally of the spreader body, and are positioned in back of and adjacent the spreader cylinder 12.

A crank shaft 17 is rockably mounted in bearing straps 18 secured to the end bars 3 and the center bar 6 in alinement with the pivotal axes of the blades 14. This crank shaft is provided with a plurality of cranks 19, the cross bars of which pass through suitable apertures in the blades below their pivotal axes. By rotating this crank shaft, the blades 14 may be rocked about their axes so as to vary their angular adjustment relative to the spreader cylinder, and to also vary the distance between the cylinder and the blades. For the purpose of securing the blades in adjustment, a ratchet wheel 20 is keyed on the shaft 17, near one end thereof, and is adapted to be engaged by a gravity pawl 21 pivotally mounted on one end of the hood. This pawl engages the teeth of the ratchet so as to hold the blades in raised position. The blades 14 are, of course, so spaced as to permit the teeth of the cylinder to pass between the same thus preventing interference by the blades with the rotation of the cylinder.

As the manure is discharged from the cylinder 12 it impinges upon the blades 14 so as to be thoroughly cut and disintegrated thereby, after which it is directed by the hood downward onto the ground surface. The blades, in addition to acting as disintegrating members, also serve to divide the manure which is discharged from the spreader cylinder into a plurality of parallel streams of equal width, thus facilitating the spreading operation and insuring uniform distribution. By adjusting the blades 14 about their pivotal axes so as to vary their angular adjustment and their distance away from the spreader cylinder, their effectiveness as disintegrating and dividing elements may be varied to suit especial conditions.

The hood which is formed by the frame bars and the sheet metal covering therefor, fits about the spreader cylinder and serves to protect or shield the same from the wind. By this arrangement, the blowing of the manure such as occurs where the cylinder is not protected by a hood is entirely eliminated, as the manure is directed straight downward on the ground surface as it leaves the cylinder. This prevents interference with the spreading operation by the wind and insures uniform and even distribution, which as above stated is one of the main objects of the invention.

There may be slight changes made in the construction and arrangement of the different parts of my invention without departing from the field and scope of the same, and I intend to include all such variations as fall within the scope of the appended claims in this application in which a preferred form only of the invention is disclosed.

What I claim is:

1. The combination with a spreader body and a cylinder rotatably mounted thereon and provided with outwardly projecting teeth, of a hood carried by the body and extending about the cylinder, a plurality of blades pivotally mounted at their upper ends on a common axis positioned in rear of the cylinder and extending from a horizontal plane below the axis of the cylinder to a horizontal plane above the cylinder body said blades being spaced apart so as to permit the teeth of the cylinder to pass between them and having their front edges sharpened to provide cutting elements, and means for simultaneously adjusting the blades about their pivotal axis so as to vary their inclination and their distance away from the cylinder.

2. The combination with a spreader body and a cylinder rotatably mounted thereon and provided with outwardly projecting teeth, of a hood secured on said body and extending about the cylinder, a plurality of disintegrating members mounted adjacent the back of the hood for adjustment forward and rearward of said hood, said members being spaced apart so as to permit passage of the teeth of the cylinder between them, and means for adjusting said disintegrating members.

3. The combination with a spreader body and a cylinder rotatably mounted thereon and provided with outwardly projecting teeth, of a hood carried by the body and extending about the upper and rearward portion of the cylinder, a plurality of forwardly and downwardly inclined disintegrating blades pivotally mounted in said hood at the rear thereof, said blades being spaced apart so as to permit the teeth of the cylinder to pass between them, a transverse shaft rockably mounted in said hood and provided with a plurality of cranks loosely secured through said blades, and means for securing the shaft in rotary adjustment.

4. In manure spreader attachments, a hood adapted to be secured to the body of a manure spreader so as to extend about the spreader cylinder thereof, a plurality of disintegrating members mounted adjacent the back of the hood for adjustment forward and rearward of said hood, and means for adjusting said disintegrating members.

5. In manure spreading attachments, a hood adapted to be secured to the body of a spreader so as to extend about the rearward portion of the spreader cylinder thereof, a plurality of forwardly directed and forwardly and downwardly inclined disintegrating blades pivotally mounted in said hood at the rear thereof, a transverse shaft rockably mounted in said hood and provided with a plurality of cranks loosely secured through said blades, and means for securing the shaft in rotary adjustment.

In testimony whereof I affix my signature in presence of two witnesses.

THOMAS FELCYN.

Witnesses:
L. V. WIDMARK,
S. E. ISFELD.